(12) United States Patent
Haberkorn et al.

(10) Patent No.: US 10,371,338 B2
(45) Date of Patent: Aug. 6, 2019

(54) VEHICLE HEADLIGHT

(71) Applicant: GM GLOBAL TECHNOLOGY OPERATIONS LLC, Detroit, MI (US)

(72) Inventors: Rouven Haberkorn, Darmstadt (DE); Philipp Roeckl, Aschaffenburg (DE); Isabell Woelfelschneider, Ruesselsheim (DE); Ursula Deppisch, Mainz (DE); Alexander Schmidt, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/888,466

(22) Filed: Feb. 5, 2018

(65) Prior Publication Data

US 2018/0224081 A1  Aug. 9, 2018

(30) Foreign Application Priority Data

Feb. 4, 2017  (DE) .................. 10 2017 001 019

(51) Int. Cl.
| | |
|---|---|
| *F21S 41/36* | (2018.01) |
| *F21S 41/141* | (2018.01) |
| *F21S 45/48* | (2018.01) |
| *G02B 27/30* | (2006.01) |
| *B60Q 1/04* | (2006.01) |
| *G02B 19/00* | (2006.01) |
| *F21S 41/365* | (2018.01) |
| *F21Y 115/10* | (2016.01) |
| *F21S 41/143* | (2018.01) |
| *F21S 45/47* | (2018.01) |

(52) U.S. Cl.
CPC ............... *F21S 41/36* (2018.01); *B60Q 1/04* (2013.01); *F21S 41/141* (2018.01); *F21S 41/365* (2018.01); *F21S 45/48* (2018.01); *G02B 19/0023* (2013.01); *G02B 19/0061* (2013.01); *G02B 27/30* (2013.01); *F21S 41/143* (2018.01); *F21S 45/47* (2018.01); *F21Y 2115/10* (2016.08)

(58) Field of Classification Search
CPC .......... F21S 41/36; F21S 41/365; F21S 45/48; F21S 41/141; F21S 45/47; F21S 41/143; G02B 19/0023; G02B 19/0061; G02B 27/30; B60Q 1/04; F21Y 2115/10
See application file for complete search history.

(56) References Cited

U.S. PATENT DOCUMENTS

2007/0285939 A1* 12/2007 Tachibana ............ F21S 41/255
362/509
2009/0284981 A1* 11/2009 Iwasaki ................ F21S 41/147
362/518

(Continued)

*Primary Examiner* — Kevin Quarterman
(74) *Attorney, Agent, or Firm* — Lorenz & Kopf, LLP

(57) ABSTRACT

A vehicle headlight includes an LED lamp that emits a light bundle in a first main direction of propagation. A first reflector for deflecting the light bundle from the first main direction of propagation into a second main direction of propagation. A second reflector that deflects the light bundle from the second main direction into a third direction of propagation. The first main direction of propagation and the third main direction of propagation span an acute angle that is smaller than the angle spanned by the first main direction of propagation and second main direction of propagation.

7 Claims, 1 Drawing Sheet

(56) References Cited

U.S. PATENT DOCUMENTS

| | | | | |
|---|---|---|---|---|
| 2010/0321947 | A1* | 12/2010 | Hamashima | F21S 41/192 |
| | | | | 362/517 |
| 2011/0280030 | A1* | 11/2011 | Iwasaki | F21S 41/147 |
| | | | | 362/519 |
| 2013/0021817 | A1* | 1/2013 | Ishida | F21S 41/147 |
| | | | | 362/517 |
| 2013/0204498 | A1* | 8/2013 | Suzuki | B60Q 1/04 |
| | | | | 701/49 |
| 2015/0338047 | A1* | 11/2015 | Honda | F21V 13/04 |
| | | | | 362/517 |
| 2017/0241605 | A1* | 8/2017 | Yamamoto | F21S 41/338 |
| 2018/0031202 | A1* | 2/2018 | Bhakta | F21S 41/675 |

* cited by examiner

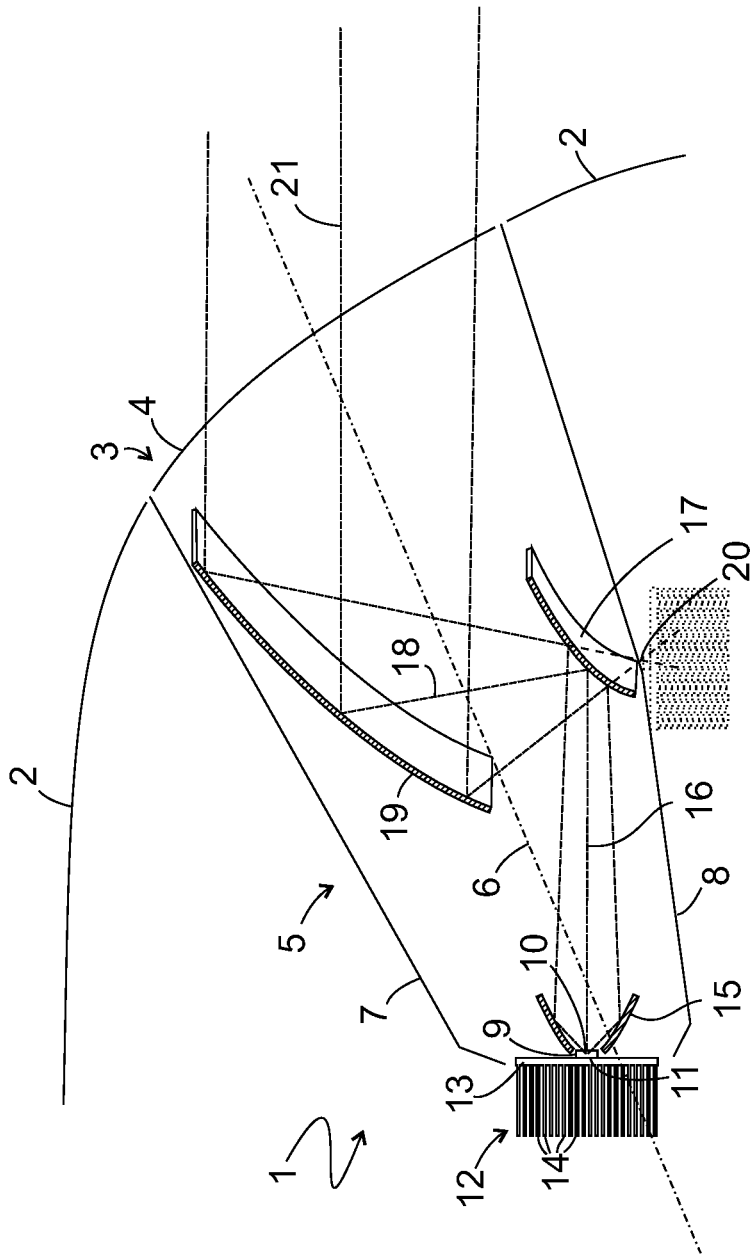

VEHICLE HEADLIGHT

CROSS-REFERENCE TO RELATED APPLICATION

This application claims priority to German Patent Application No. 102017001019.6, filed Feb. 4, 2017, which is incorporated herein by reference in its entirety.

TECHNICAL FIELD

The present disclosure pertains to a vehicle headlight with LED lamps.

BACKGROUND

In the field of vehicle headlights, LEDs have largely forced conventional filament lamps out of the market due to their compactness and energy efficiency.

While a filament radiates in all directions, an LED at best does so in a half space. This must be considered during the construction and arrangement of the beam shaping components of the headlight. While both reflectors and refractive light elements are as a rule used in a headlight with filament lamps, to collect the emitted light and shape it into a light bundle, a reflector is sufficient for this purpose in a headlight with LED lamps.

To avoid glare caused by the light radiated by the LED lamp directly toward oncoming traffic, it is helpful to orient the light-emitting surface in such a way that it is not visible from the viewing direction of oncoming traffic, e.g., to downwardly direct its surface normal, so that essentially downwardly directed emitted light is reflected by the reflector in a roughly horizontal, final main direction of propagation. To obtain only a slightly divergent light bundle after reflection, the LED lamp must be placed near the focus of the reflector, which makes the overall height of the headlight distinctly larger than the cross section of the light bundle radiated by it. This makes it harder to accommodate the headlight on the vehicle.

SUMMARY

The present disclosure provides a vehicle headlight with LED lamp and beam shaping reflector, in which the cross-sectional dimensions of the headlight are only slightly larger than those of the light bundle emitted by the headlight.

In one embodiment of the present disclosure, a vehicle headlight includes an LED lamp that emits a light bundle in a first main direction of propagation. A first reflector deflects or re-directs the light bundle from the first main direction of propagation into a second main direction of propagation, and a second reflector deflects or re-directs the light bundle from the second main direction into a third main direction of propagation. The first main direction of propagation and the third direction of propagation span an acute angle that is smaller than the angle spanned by the first main direction of propagation and second main direction of propagation.

The LED lamp can in this way find space at one location that is recessed into the vehicle interior behind the second reflector when the headlight is built into a vehicle as compared to a headlight without a first reflector. Since no space next to the second reflector is thus required for the LED lamp, the dimensions of the headlight transversely to the final main direction of propagation can be reduced.

The light formed by the light bundle of a headlight propagates in different directions, wherein the intensity can vary greatly depending on the direction. To describe the global orientation of a light bundle, reference must therefore be made to a main direction of propagation.

A main direction of propagation may be defined in various ways with the main directions of propagation obtained based upon various definitions differing from each other to only a slight extent. For example, the main direction of propagation can be understood as the direction in which the intensity of the light bundle reaches its maximum. The main direction of propagation can also be an average direction of propagation averaged over the entire distribution of light and weighted with the intensity.

To minimize the space required by the first reflector, if the second reflector is concavely curved, then the distance between the first and second reflectors should be smaller along the second main direction of propagation than a focal length of the second reflector.

The first reflector can be convexly curved. This makes it possible to illuminate it with a narrowly bundled beam having a slight cross-sectional dimension, which can be passed by the second reflector in a space saving manner.

To form such a bundled beam, a collimator can be arranged between the LED lamp and the first reflector. In the simplest case, the collimator is a converging lens, which is mounted in direct contact with the LED lamp.

A heatsink for cooling the LED lamp can be provided on a rear surface of the LED lamp, which opposes an emission surface that emits the light bundle in the first main direction of propagation. Given a headlight with such a heatsink, the structural configuration described above is especially advantageous, since the heatsink here also can be largely arranged covered behind the LED lamp and reflectors opposite the final main direction of propagation, and only increases the dimensions of the headlight transversely to the third main direction of propagation marginally at best.

The heatsink can be a cooling body with a base plate abutting against the rear surface and ribs spaced apart from the base plate.

BRIEF DESCRIPTION OF THE DRAWINGS

The present disclosure will hereinafter be described in conjunction with the following drawing FIGURE, wherein like numerals denote like elements.

FIG. 1 shows a schematic section through a headlight according to the present disclosure.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

FIG. 1 shows the headlight 1 and a cutout of the outer body skin 2 of a vehicle that envelops it, into which it is built. The section plane extends in the vertical and longitudinal direction of the vehicle. The headlight 1 is recessed into an opening 3 of the outer body skin; a transparent screen 4 of the headlight 1 abuts flush against the surrounding outer body skin 2 in a known manner. Just as the enveloping outer body skin 2, the screen 4 slopes forward at an inclination, i.e., toward the right on the FIGURE.

A housing 5 of the headlight 1 adjoins the screen 4, and extends from the opening 3 into the interior of the body defined by the body skin 2. The housing 5 has an axis 6, transversely to which its dimensions are not larger at any location than directly on the screen 4, i.e., walls 7, 8 of the housing 5 run either parallel to the axis or approach each other as depicted on the FIGURE with increasing distance from the screen 4. In this way, the headlight 1 can be introduced along a straight line along the axis 6 into the recess of the body provided for it. The axis 6 can run horizontally; on the FIGURE, it slopes slightly backward in relation to the longitudinal direction of the vehicle.

Mounted on the end of the housing 5 facing away from the screen 4 is an LED lamp 9. The LED lamp 9 includes a single, efficient light-emitting diode, typically a white light LED, or several closely adjacent light-emitting diodes that emit in the same spatial area. The latter may have different emission wavelengths selected to overlap to yield white light.

A light-emitting surface of the lamp 9, hereinafter also referred to as an emission surface 10, faces toward the front in the traveling direction; its surface normal can essentially coincide with the longitudinal direction of the vehicle, so that the main propagation of the light originating from the emission surface 10 also essentially corresponds with the longitudinal direction of the vehicle.

The emission surface 10 lies opposite a rear surface 11 of the LED lamp 9. Secured to the latter as the heatsink is a cooling body 12, typically made from aluminum. The cooling body 12 in a known manner has a base plate 13, from which numerous ribs 14 protrude on one side. The other side of the base plate 13 abuts against the rear surface 11. The ribs 14 are outwardly exposed on the housing 5, to be able to transfer the waste heat of the LED lamp 9 into the interior of the body unimpeded.

A collimator 15 may be configured as a reflector as depicted on the FIGURE, e.g., as a paraboloid, with the LED lamp 9 placed in its focal point, or as a converging lens preferably placed on the emission surface 10. The collimator 15 shapes the light conically emitted from the emission surface 10 into just a sparingly divergent or even slightly convergent light bundle, whose main direction of propagation 16 (first main direction) essentially corresponds with the longitudinal direction of the vehicle.

This light bundle strikes a first reflector 17 arranged in front of the LED lamp 9 in the longitudinal direction of the vehicle, which deflects or re-direct the light bundle in a second main direction of propagation 18. The second main direction of propagation deviates from the first main direction of propagation by an angle of approx. 90°, or slightly greater than 90°, and is essentially directed vertically upward. The first reflector 17 is convexly curved, so that the light bundle is divergent following its reflection on the first reflector 17, and illuminates another second reflector 19 arranged above the first reflector 17 over a larger surface than the first reflector 17. For this reason, the dimensions of the second reflector 19 are also larger than those of the first reflector 17. The narrower the light between the collimator 15 and first reflector 17 is bundled, the larger the second reflector 19 can be made without it shading the light emanating from the collimator 15.

The diverging light beams from the first reflector 17 have a virtual focus 20 lying under the reflector 17. The light bundle propagating in the direction 18 from the first reflector 17 simulates that which could be generated by a lamp (indicated by dashed lines in FIG. 1) placed on this focus 20. However, such a lamp and in particular a cooling body allocated thereto would find no space in the housing 5, and a housing downwardly expanded to provide space for the lamp could either no longer be introduced into the opening 3 along a straight line, or would require that the opening 3 be expanded, which is also unsatisfactory if the expansion is not required for radiating the light.

The second reflector 19 deflects or re-direct the light bundle in a third main direction of propagation 21, which again essentially coincides with the longitudinal direction of the vehicle, and in which it passes the screen 4. This third main direction of propagation 21 thus is parallel to or deviates from the first main direction of propagation 16 only by a small angle. It can be inclined slightly toward the front to generate a low beam light distribution. The second reflector 19 is concavely curved, so that the light bundle propagates in the third main direction of propagation 21 with a slight divergence.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. A vehicle headlight for a vehicle, comprising:
    an LED lamp configured to emit a light bundle in a first main direction of propagation, the first main direction of propagation being substantially parallel to a longitudinal direction of the vehicle;
    a collimator mounted in direct contact with the LED lamp, the collimator comprising a converging lens configured to bundle the light bundle in the first main direction of propagation;
    a convex reflector configured to redirect the light bundle from the first main direction of propagation into a second main direction of propagation; and
    a concave reflector configured to redirect the light bundle from the second main direction into a third main direction of propagation, the third main direction of propagation being substantially parallel to the longitudinal direction of the vehicle;
    wherein the first main direction of propagation and the third direction of propagation span an acute angle that is smaller than an angle spanned by the first main direction of propagation and second main direction of propagation.

2. The vehicle headlight according to claim 1, wherein a distance between the concave reflector and convex reflector is smaller along the second main direction of propagation than a focal length of the concave reflector.

3. The vehicle headlight according to claim 1, wherein the LED lamp comprises an emission surface configured to emit the light bundle in the first main direction of propagation, and a heatsink secured to a rear surface opposite the emission surface.

4. The vehicle headlight according to claim 3, wherein the heatsink is concealed behind the concave and convex reflectors as seen from a viewing direction opposite the third main direction of propagation.

5. The vehicle headlight according to claim 3, wherein the heatsink comprises a cooling body having a base plate abutting the rear surface and a plurality of fins extend from the base plate away from the rear surface.

6. The vehicle headlight according to claim 1, wherein the first main direction of propagation, the second main direction of propagation, and third main direction of propagation are an average direction of propagation over an entire distribution of light from the LED lamp, the convex reflector and the concave reflector.

7. A vehicle headlight for a vehicle, comprising:
an LED lamp configured to emit a light bundle in a first main direction of propagation, the first main direction of propagation being substantially parallel to a longitudinal direction of the vehicle;
a collimator mounted in direct contact with the LED lamp, the collimator comprising a converging lens configured to bundle the light bundle in the first main direction of propagation;
a first reflector having a first convexly curved element configured to redirect the light bundle from the first main direction of propagation into a second main direction of propagation; and
a second reflector having a second convexly curved element configured to redirect the light bundle from the second main direction into a third main direction of propagation, the third main direction of propagation being substantially parallel to the longitudinal direction of the vehicle, wherein a distance between the second reflector and first reflector is smaller along the second main direction of propagation than a focal length of the second reflector;
wherein the first main direction of propagation and the third direction of propagation span an acute angle that is smaller than an angle spanned by the first main direction of propagation and second main direction of propagation.

* * * * *